United States Patent
Tsujino et al.

(10) Patent No.: US 11,479,238 B2
(45) Date of Patent: Oct. 25, 2022

(54) PARKING ASSIST SYSTEM

(71) Applicant: HONDA MOTOR CO., LTD., Tokyo (JP)

(72) Inventors: Miki Tsujino, Saitama (JP); Hiroshi Yamanaka, Saitama (JP); Yasushi Shoda, Saitama (JP); Megumi Kageyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 262 days.

(21) Appl. No.: 16/907,604

(22) Filed: Jun. 22, 2020

(65) Prior Publication Data

US 2020/0398826 A1 Dec. 24, 2020

(30) Foreign Application Priority Data

Jun. 24, 2019 (JP) .............................. JP2019-116746
Dec. 13, 2019 (JP) .............................. JP2019-225927

(51) Int. Cl.
*B60W 30/06* (2006.01)
*G08G 1/16* (2006.01)
(Continued)

(52) U.S. Cl.
CPC ............. *B60W 30/06* (2013.01); *B60K 35/00* (2013.01); *G06V 20/586* (2022.01); *G08G 1/143* (2013.01);
(Continued)

(58) Field of Classification Search
CPC ..... B60W 30/06; G06V 20/586; B60K 35/00; B60K 2370/175; B60K 2370/152; B60K 2370/166; B60K 2370/1434; B60K 2370/739; B60K 2370/1438; G08G 1/143; G08G 1/168
See application file for complete search history.

(56) References Cited

U.S. PATENT DOCUMENTS 10,583,829 B2 * 3/2020 Kim ..................... B62D 15/028
2013/0073119 A1 * 3/2013 Huger .................. B62D 15/027
701/1

(Continued)

FOREIGN PATENT DOCUMENTS

CN 108016435 A * 5/2018 ............... B60R 1/00
CN 110214097 A * 9/2019 ............. B60R 21/00
(Continued)

OTHER PUBLICATIONS

Notice of Reasons for Refusal for Patent Application JP2019-225927 dated Sep. 21, 2021; 9 pp.

*Primary Examiner* — Chico A Foxx
(74) *Attorney, Agent, or Firm* — Armstrong Teasdale LLP

(57) ABSTRACT

A parking assist system includes a control device configured to control screen display of a display device, to set the parking position candidate selected by an occupant as a target parking position, and to control an autonomous parking operation to autonomously move the vehicle to the target parking position. When multiple parking position candidates partially overlapping with each other are detected by a parking position candidate detector, the control device causes the display device to display the multiple parking position candidates so as to partially overlap with each other and to be selectable.

9 Claims, 13 Drawing Sheets

(51) Int. Cl.
*G08G 1/14* (2006.01)
*B60K 35/00* (2006.01)
*G06K 9/00* (2022.01)
*G06V 20/58* (2022.01)

(52) U.S. Cl.
CPC ...... *G08G 1/168* (2013.01); *B60K 2370/1434* (2019.05); *B60K 2370/1438* (2019.05); *B60K 2370/152* (2019.05); *B60K 2370/166* (2019.05); *B60K 2370/175* (2019.05); *B60K 2370/739* (2019.05)

(56) References Cited

U.S. PATENT DOCUMENTS

2014/0121883 A1* 5/2014 Shen ................. B62D 15/0285
                                                    701/28
2015/0254981 A1* 9/2015 Tachibana ................ B60R 1/00
                                                    340/932.2
2016/0284217 A1* 9/2016 Lee .......................... B60D 1/30
2017/0305464 A1* 10/2017 Tani ..................... B62D 15/028
2018/0345955 A1* 12/2018 Kim .................. B62D 15/0285

FOREIGN PATENT DOCUMENTS

| JP | 2009202610 A | 9/2009 |
| JP | 2013035327 A | 2/2013 |
| JP | 2015074262 A | 4/2015 |
| JP | 2015187642 A | 10/2015 |
| JP | 2016016681 A | 2/2016 |
| JP | 2018034645 A | 3/2018 |

\* cited by examiner

PARKING ASSIST SYSTEM

TECHNICAL FIELD

The present disclosure relates to a parking assist system for autonomously moving a vehicle to park the vehicle.

BACKGROUND ART

There is known a parking assist device that is configured to generate a look-down image including multiple parking spaces from a captured image of the surroundings of the vehicle, to superimpose temporary parking setting frames, each being placed at a predetermined position relative to the vehicle, on the look-down image to thereby generate setting information, to display the setting information on the display (see JP2013-35327A). The temporary parking setting frames are superimposed on the look-down image so as to be distinguishable in accordance with multiple parking modes including perpendicular parking and parallel parking.

Further, as a parking and unparking assist device capable of displaying information regarding assist required by the driver on the display unit, there is known a device which, when it is determined that an assist control is to be started, displays unparking assist information if the shift position is a non-traveling position, and display parking assist information if the shift position is a traveling position (see JP2018-34645A). In this parking and unparking assist device, display screens for displaying the parking assist information have a parking space search mode and a steering control mode. In a backward parking (perpendicular parking) assist screen in the parking space search mode, a backward parking assist selection switch, a parallel parking assist selection switch, an unparking assist selection switch, a left backward parking start switch, a right backward parking start switch, etc. are displayed so as to be selectable. Further, the backward parking assist screen includes a multi-view camera display region in which are displayed a composite image of the surroundings of the vehicle, a target frame (left-backward parking space, right-backward parking space), and an icon showing the vehicle.

In addition, there is known a parking space recognition device configured to detect a parking space in the travel direction of the vehicle from a long distance (JP2016-16681A). This parking space recognition device detects parking space lines on either side of the vehicle from the images captured by the side imaging units for capturing images including the road surface on the left and right sides, calculates the characteristics of the parking space lines on either side of the vehicle, sets parameters for detecting the parking space lines in the travel direction based on the calculated characteristics, and detects, based on the parameters, a parking space in which the vehicle can be parked from the images captured by a travel direction imaging unit for capturing images including the road surface in the travel direction of the vehicle. For the parking space line detected, a parking type (perpendicular parking, angle parking, or parallel parking) indicating the parking mode is determined. When multiple parking spaces are detected, priority is determined for each of the detected parking spaces such that a parking space easier to park the vehicle in is given a higher priority, and the information on the multiple parking spaces is displayed on the monitor.

In the conventional parking assist systems, it is necessary to move the vehicle such that the temporary parking setting frame (target frame) located at a predetermined position relative the vehicle matches a parking space displayed on the screen. Further, it is necessary to select a parking mode (perpendicular parking mode or parallel parking mode) by selecting a target frame (perpendicular parking frame or parallel parking frame) in which the vehicle it to be parked. Here, if the parking assist system is provided with the parking space recognition device capable of detecting parking spaces as disclosed in JP2016-16681A and is configured to display the detected parking spaces on the screen so as to be selectable. it may be possible to omit the operation of moving the vehicle.

However, in the parking assist system having such a configuration, in the case where the parking space recognition device erroneously detects a parking space or in the case where a parking space cannot be detected such as when there is no parking space line on the road surface or, even if there is a parking space line, the parking space line is too thin or the surroundings are too dark, the parking spaces (spaces available for parking) cannot be displayed properly even if the parking spaces are actually present around the vehicle, and the parking assist cannot be performed.

SUMMARY OF THE INVENTION

In view of such a background, an object of the present invention is to provide a parking assist system that, even when a parking space is falsely detected or a parking space cannot be detected, can display parking position candidates on the screen and can execute parking assist in response to selection of one of the parking position candidates by the occupant.

To achieve the object, an embodiment of the present invention provide a parking assist system (1) comprising: a parking position candidate detector (7, 41, 43) configured to detect one or more parking position candidates, each consisting of an undelimited parking space (51) set in a parking area (50) around a vehicle or an available delimited parking space (52) around the vehicle; a display device (32) configured to display the one or more parking position candidates on a screen; a selection input member (35, 32) configured to receive a selection operation by an occupant of the vehicle to select one of the one or more parking position candidates displayed on the display device; and a control device (15) configured to control screen display of the display device, to set the parking position candidate selected by the occupant via the selection input member as a target parking position, and to control an autonomous parking operation to autonomously move the vehicle to the target parking position, wherein when multiple parking position candidates partially overlapping with each other are detected by the parking position candidate detector, the control device causes the display device to display the multiple parking position candidates so as to partially overlap with each other and to be selectable.

According to this configuration, when the parking position candidate detector detects multiple parking position candidates partially overlapping with each other, the occupant is allowed to select a parking position candidate in which the occupant desires to park the vehicle from among the partially overlapping parking position candidates displayed on the display device, so that the control device can perform the parking operation (parking assist).

In the above configuration, preferably, the parking position candidate detector is configured to detect the parking area as an area around the vehicle other than passages and obstacles and to set multiple undelimited parking spaces in the parking area such that the multiple undelimited parking spaces have longitudinal directions intersecting with each other and partially overlap with each other.

According to this configuration, multiple undelimited parking spaces are set in a large parking area, and therefore, the occupant can select, as a target parking position, a parking position in which the occupant desires to park the vehicle from among the multiple undelimited parking spaces set in the parking area.

In the above configuration, preferably, the multiple parking position candidates partially overlapping with each other include at least two of a parallel parking position candidate, a perpendicular parking position candidate, and an angle parking position candidate.

According to this configuration, parking position candidates having longitudinal directions intersecting with each other, namely, parking position candidates oriented in different directions in the parking area can be displayed on the display screen, and the options for the target parking position can be expanded.

In the above configuration, preferably, the selection input member includes a touch panel configured to detect a touch on the screen of the display device and to receive an input operation set for a region in which the touch is detected, wherein when the touch panel detects a touch on mutually overlapping parts of the multiple parking position candidates in the screen, the control device causes the display device to display a selection screen (60) for selecting one of the multiple parking position candidates including the mutually overlapping parts.

According to this configuration, when the occupant makes an operation input by touching the mutually overlapping parts of the multiple partially overlapping parking position candidates inadvertently or due to the occupant's insufficient understanding of the operating method, the occupant can select one of the parking position candidates on the selection screen.

In the above configuration, preferably, when the touch panel detects a touch on a non-overlapping part of one of the multiple parking position candidates partially overlapping with each other, the control device causes the display device to display a confirmation screen (61) for confirming selection of the parking position candidate having the non-overlapping part on which the touch was detected.

According to this configuration, when the occupant wants to select one of the parking position candidates partially overlapping with each other, it is possible to prevent the occupant from inadvertently selecting an undesired parking position candidate due to an erroneous operation.

In the above configuration, preferably, when the multiple parking position candidates partially overlapping with each other are detected by the parking position candidate detector, the control device limits a number of those among the multiple parking position candidates partially overlapping with each other that are allowed to be displayed on the display device to two.

According to this configuration, even if more than two parking position candidates partially overlapping with each other are detected by the parking position candidate detector, only two of the detected parking position candidates are displayed on the display device. Therefore, the selection operation of the target parking position is prevented from being complicated and erroneous selection operation of the target parking position can be avoided.

In the above configuration, preferably, the parking assist system further comprises an imaging device (19) configured to capture an image of surroundings of the vehicle, wherein the control device is configured to cause the display device to display the one or more parking position candidates so as to be superimposed on the image captured by the imaging device.

According to this configuration, the occupant can easily recognize where in the parking area the one or more parking position candidates displayed on the screen of the display device are located, and therefore, selection of one of the one or more parking position candidates is easy.

In the above configuration, preferably, when a vehicle speed is equal to or higher than a first predetermined value, the control device disables selection of the target parking position by the selection input member.

When the vehicle is moving at high speed, the detection accuracy of the parking position candidates decreases. According to this configuration, when the vehicle speed is equal to or higher than the first predetermined value, the selection of the target parking position is disabled, whereby the occupant's selection operation from among the parking position candidates detected with low detection accuracy can be prevented.

In the above configuration, preferably, when the vehicle speed is equal to or higher than the first predetermined value, the control device causes the display device to display the one or more parking position candidates so as to be unselectable by the selection input member.

According to this configuration, when the vehicle is traveling at the first predetermined value or higher, the occupant can understand that the parking position candidates cannot be selected. Therefore, the occupant is prompted to reduce the vehicle speed so that the parking position candidates can be detected at a low vehicle speed where the detection accuracy is high.

In the above configuration, preferably, when the vehicle speed is equal to or higher than a second predetermined value higher than the first predetermined value, the control device does not cause the display device to display the one or more parking position candidates.

According to this configuration, when the vehicle is traveling at the second predetermined value or higher, the occupant can understand that the parking position candidates cannot be detected. Therefore, the occupant is prompted to decrease the vehicle speed to a vehicle speed at which the parking position candidates can be detected.

Thus, according to the present invention, it is possible to provide a parking assist system that, even when a parking space is falsely detected or a parking space cannot be detected, can display parking position candidates on the screen and can execute parking assist in response to selection of one of the parking position candidates by the occupant.

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to make the vehicle travel autonomously.

Figure 1:
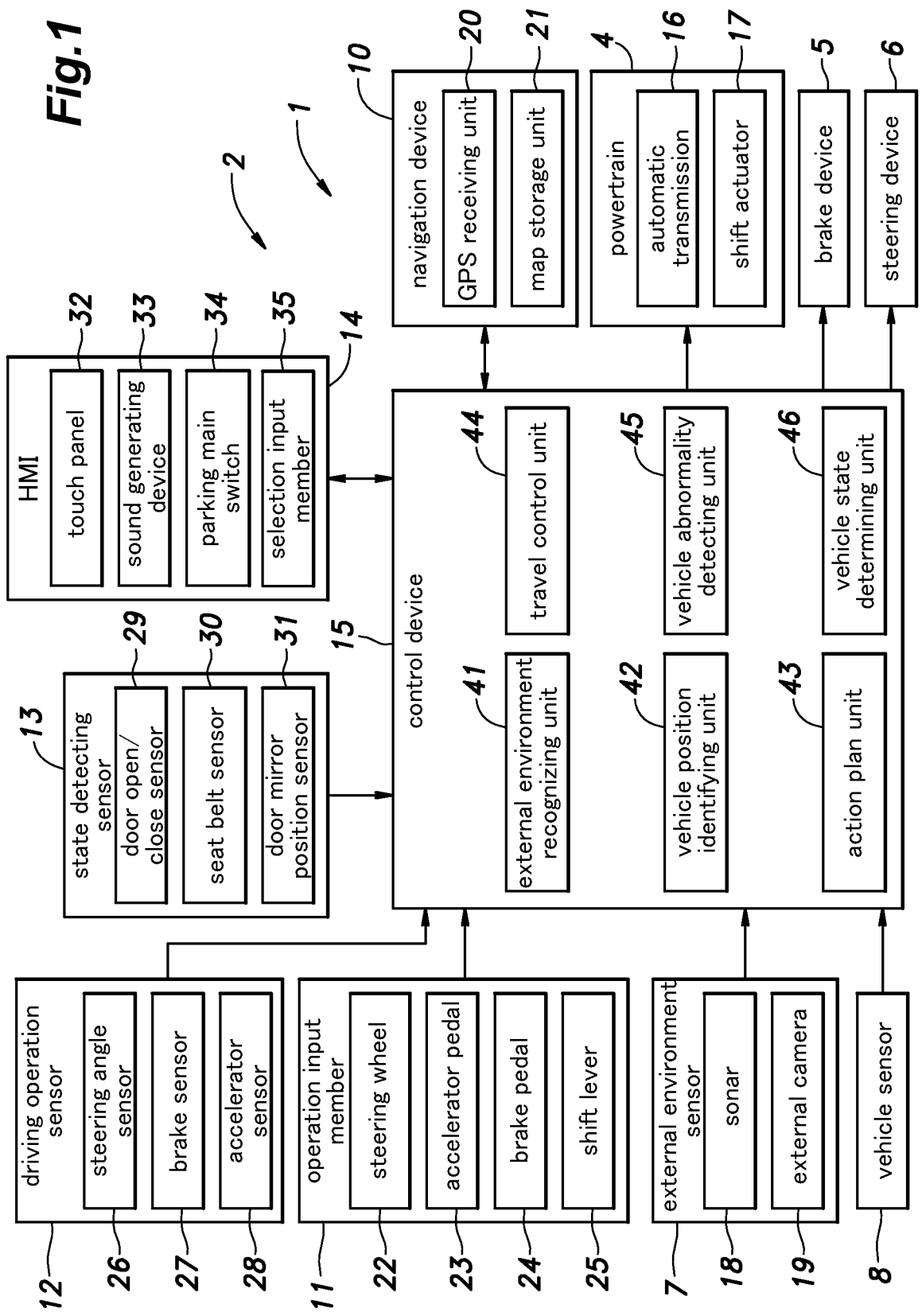
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (a shift member). The shift lever 25 is configured to receive an operation for selecting the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 is constituted of the control device 15, the external environment sensor 7 (the sonars 18 and the external cameras 19) serving as a parking position candidate detector, the touch panel 32 serving as a display device on which a selection operation can be performed, and the selection input member 35.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

More specifically, the vehicle state determining unit 46 may determine the initiation of the override operation when the pressing amount of the brake pedal 24 acquired (detected) by the brake sensor 27 has reached or exceeded a prescribed threshold (hereinafter referred to as "pressing threshold"). Additionally or alternatively, the vehicle state determining unit 46 may determine the initiation of the override operation when a pressing amount of the accelerator pedal 23 acquired (detected) by the accelerator sensor 28 has reached or exceeded a prescribed threshold. The vehicle state determining unit 46 may also determine the initiation of the override operation when a changing rate of the steering angle obtained (detected) by the steering angle sensor 26 has reached or exceeded a prescribed threshold.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

Figure 2:
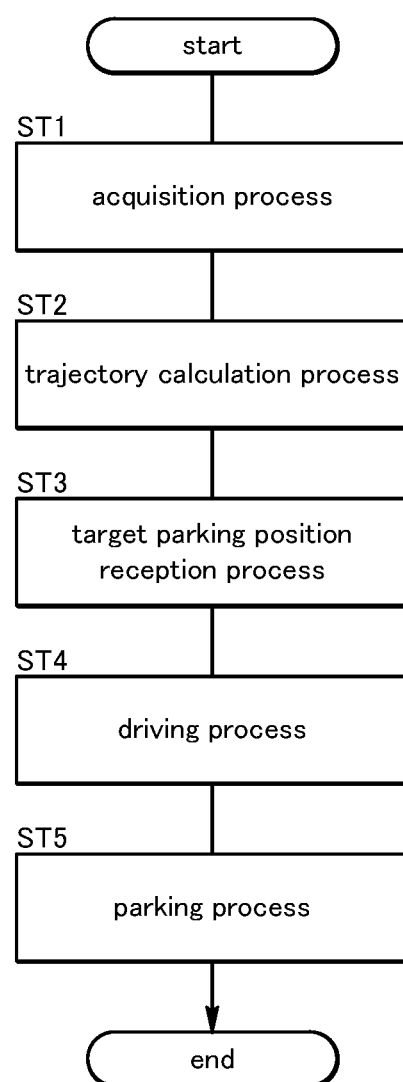
FIG. 2 is a flow chart of an automatic parking process.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking position candidate, the action plan unit 43 makes the touch panel 32 display a frame that indicates the parking position candidate and an icon that corresponds to the frame in at least one of the look-down image and the bird's-eye image (in the look-down image in FIG. 3A) in an overlapping manner. The icon consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3A:
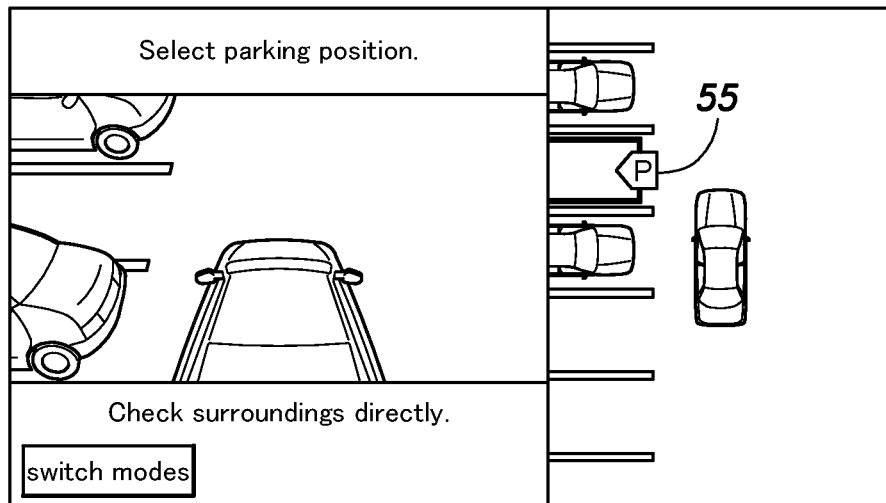
FIG. 3A is a diagram showing a screen display of a touch panel during a target parking position reception process.
Figure 3B:
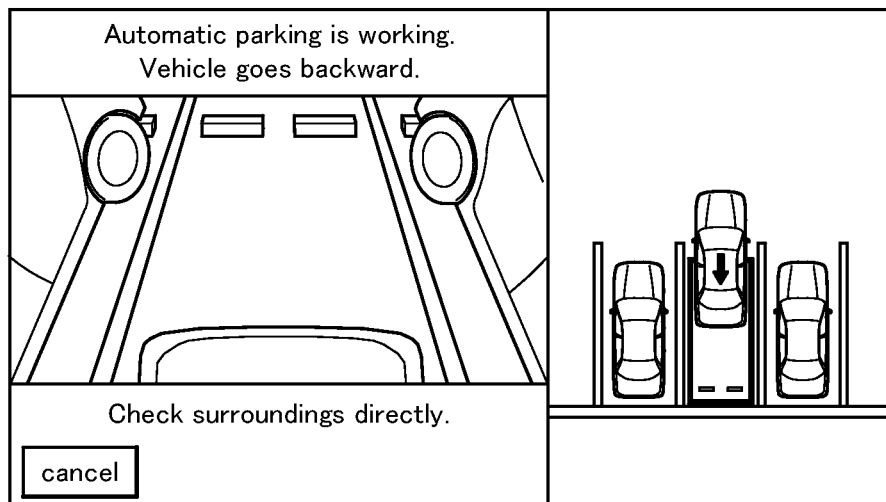
FIG. 3B is a diagram showing the screen display of the touch panel during a driving process.

After the vehicle is stopped and the target parking position is selected by the driver, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon that corresponds to the thick frame such that the thick frame and the icon overlap with the look-down image. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle travel along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 controls the powertrain 4, the brake device 5, and the steering device 6 so as to execute a switching operation for switching the travel direction of the vehicle (a reversing operation for reversing the travel direction of the vehicle). The switching operation may be executed repeatedly, or may be executed only once.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

When the vehicle state determining unit 46 determines that the vehicle is in the prohibition state during the driving process, the action plan unit 43 displays a notification that the automatic parking is suspended or canceled on the touch panel 32 and executes a deceleration process to decelerate the vehicle to stop the same. Thus, when there is a predetermined operation input by the occupant via the operation input member 11, the action plan unit 43 executes the deceleration process, whereby uneasiness that would be felt by the occupant if the movement of the vehicle were continued can be avoided.

Figure 3C:
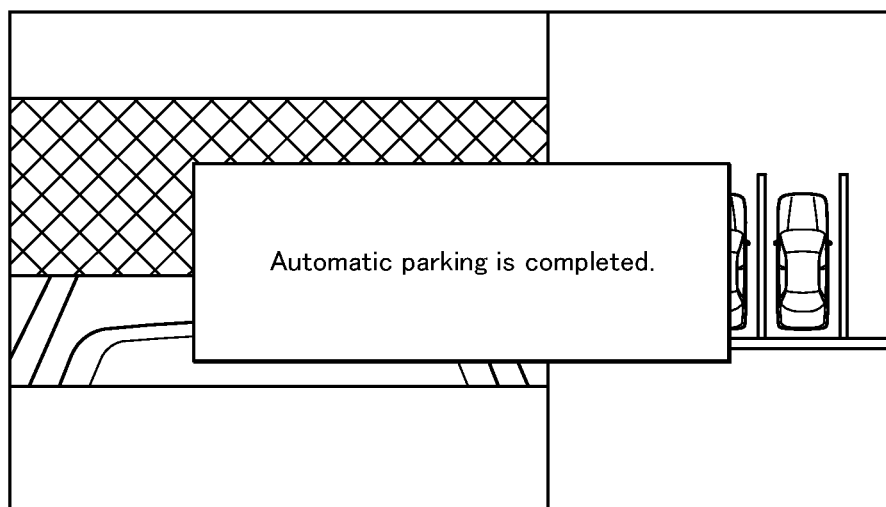
FIG. 3C is a diagram showing the screen display of the touch panel when automatic parking is completed.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof.

Next, the automatic parking process will be described in more detail. The external environment recognizing unit 41 and the action plan unit 43 perform the acquisition process and the trajectory calculation process in steps ST1 and ST2 as described above. In the acquisition process, the external environment recognizing unit 41 detects one or more parking spaces (positions where the vehicle can be parked) based on the detection result of the external environment sensor 7 (the sonars 18 and the external cameras 19).

Specifically, based on the detection result of the sonars 18, the external environment recognizing unit 41 detects an area around the vehicle that is larger than the vehicle and other than passages and objects (obstacles that hinder the travel of the vehicle), and sets the detected area as a parking area 50 (see FIG. 6). To detect the parking area 50, the external environment recognizing unit 41 detects obstacles within a range of, for example, about 7 to 8 m on either side of the vehicle with respect to the vehicle traveling at a low speed or stopped.

The external environment recognizing unit 41 determines the type of the parking area 50 based on the detected size (size in plan view) of the parking area 50. The types of the parking area 50 include a perpendicular parking area in which the vehicle can be parked in perpendicular parking, a parallel parking area in which the vehicle can be parked in parallel parking, and an angle parking area in which the vehicle can be parked in angle parking.

In a case where the detected space satisfies the parking size for one vehicle of a certain type (for example, 2.5 m×5 m (in the case of perpendicular parking) or 2 m×7 m (in the case of parallel parking)) but does not satisfy the parking size for two vehicles (for example, 5 m×5 m or 2 m×14 m), the external environment recognizing unit 41 sets a rectangular undelimited parking space 51 (see FIG. 6), in which the vehicle should be parked, substantially in the center of the detected parking area 50. At this time, the external environment recognizing unit 41 preferably sets the position of the undelimited parking space 51 in a range away from the vehicle laterally by about 1 to 2 m. The external environment recognizing unit 41 may set the position of the undelimited parking space 51 depending on the position of the detected obstacle(s). The undelimited parking space 51 is a vacant (or available) undelimited space with a sufficient size for parking the vehicle as explained above regarding the parking space. When the trajectory of the vehicle from the current position of the vehicle to the undelimited parking space 51 can be calculated by the trajectory calculation process in step ST2, the action plan unit 43 sets the undelimited parking space 51 as a parking position candidate.

In a case where the detected parking area 50 has a depth (depth in the vehicle width direction) sufficient to park the vehicle in perpendicular parking (for example, 6 m) and a width (an opening size in the vehicle travel direction) larger than a perpendicular parking size for two vehicles (for example, 5 m), the external environment recognizing unit 41 sets multiple undelimited parking spaces 51 arranged for perpendicular parking so that the maximum number of vehicles can be parked in the detected parking area 50, and, after performing the trajectory calculation process for these undelimited parking space 51, the action plan unit 43 sets them as parking position candidates. Thereby, multiple undelimited parking spaces 51 are set in the large parking area 50, and therefore, the occupant can select, as a target parking position, a parking position in which the occupant desires to park the vehicle from among the multiple undelimited parking spaces 51 set in the parking area 50.

Further, in a case where there is another vehicle already parked, the external environment recognizing unit 41 sets the type of the parking area 50 so as to match the parking arrangement of the parked other vehicle, and sets the undelimited parking spaces 51 accordingly. For example, when there is another vehicle parked in angle parking on one of the front and rear sides of the detected parking area 50 with respect to the fore and aft direction of the own vehicle, the external environment recognizing unit 41 sets multiple undelimited parking spaces 51 arranged for angle parking in the parking area 50. When there is no vehicle parked in angle parking in the vicinity, the external environment recognizing unit 41 sets multiple undelimited parking spaces 51 arranged for perpendicular parking in preference to the undelimited parking spaces 51 arranged for angle parking. Thereby, the undelimited parking spaces 51 that are considered appropriate are set in the parking area 50, and display of inappropriate parking position candidates on the touch panel 32 is suppressed.

In a case where there is no other vehicle already parked and the detected parking area 50 does not have a sufficient depth to park the vehicle in perpendicular parking but has a width (opening size in the vehicle travel direction) larger than a parallel parking size for two vehicles (for example, 14 m), the external environment recognizing unit 41 sets multiple undelimited parking spaces 51 arranged for parallel parking so that the maximum number of vehicles can be parked in the detected parking area 50.

Furthermore, in a case where the detected parking area 50 has a depth sufficient to park the vehicle in perpendicular parking (for example, 6 m) and a width larger than a parallel parking size sufficient to park the vehicle in parallel parking (for example, 7 m), the external environment recognizing unit 41 sets multiple undelimited parking spaces 51 arranged for perpendicular parking and at least one undelimited parking space 51 arranged for parallel parking in the detected parking area 50. At this time, the undelimited parking spaces 51 for perpendicular parking and the at undelimited parking space 51 for parallel parking; namely, the undelimited parking spaces 51 having longitudinal directions intersecting with each other are set to partially overlap with each other.

In this way, by setting the multiple parking position candidates partially overlapping with each other to include at least two of a parallel parking position candidate, a perpendicular parking position candidate, and an angle parking position candidate, it becomes possible to display, on the touch panel 32, parking position candidates having longitudinal directions intersecting with each other in the parking area 50, and options for the target parking position are expanded.

Also, the action plan unit 43 may coordinate the parking position candidates by using both the detection result of the sonars 18 and the detection result of the external cameras 19. Specifically, when delimiting lines, such as white lines, that define delimited parking spaces 52 (FIG. 4) can be clearly detected, the action plan unit 43 preferentially sets the delimited parking spaces 52 detected by the external cameras 19 as parking position candidates. When there are no delimiting lines that can be detected by the external cameras 19, the action plan unit 43 sets the undelimited parking spaces 51 set in the parking area 50 detected by the sonars 18 as parking position candidates. When the delimiting lines are unclearly detected by the external cameras 19, the action plan unit 43 adjusts the position of one or more undelimited parking spaces 51 detected by the sonars 18 in accordance with the position of the delimiting lines and sets the one or more undelimited parking spaces 51 as parking position candidates.

In this way, the external environment sensor 7 (the sonars 18 and the external cameras 19), the external environment recognizing unit 41, and the action plan unit 43 cooperate with each other to function as a parking position candidate detector configured to detect, as the parking position candidates, the undelimited parking spaces 51 set in the parking area 50 around the vehicle and/or the delimited parking spaces (available delimited spaces for parking) 52 around the vehicle. Namely, the parking position candidate detector is configured to detect multiple parking position candidates, each consisting of an undelimited parking space 51 set in the parking area 50 around the vehicle or a delimited parking space 52 around the vehicle.

The action plan unit 43 performs the trajectory calculation process for all of the undelimited parking spaces 51 and thereafter sets them as parking position candidates. In addition, the action plan unit 43 performs the trajectory calculation for the available (vacant) delimited parking spaces 52 (FIG. 4) detected by the external cameras 19 and when the trajectory of the vehicle can be calculated for some delimited parking spaces 52, sets these delimited parking spaces 52 as parking position candidates.

The action plan unit 43 displays a frame indicating the detected parking position candidate on the screen of the touch panel 32 as described above. When multiple parking position candidates are detected, the action plan unit 43 displays frames indicating the respective parking position candidates on the screen of the touch panel 32. However, in the action plan unit 43, an upper limit number of the parking position candidates to be displayed on the touch panel 32 is set, and when the number of the detected parking position candidates exceeds the upper limit number, the action plan unit 43 performs a parking position candidate selection process of selecting the parking position candidates to be displayed on the touch panel 32 from the detected parking position candidates according to the predetermined rule. In the present embodiment, the upper limit number of the parking position candidates displayed on the touch panel 32 is set to 3.

Thus, when the number of the detected parking position candidates exceeds the upper limit number, the action plan unit 43 selects the upper limit number of parking position candidates to be displayed on the touch panel 32 from the detected parking position candidates according to the predetermined rule. Therefore, it is possible to prevent the processing load of the control device 15 from becoming excessive and the selection operation from becoming complicated while allowing the occupant to set the parking position in which the occupant desires to park the vehicle as the target parking position.

In the parking position candidate selection process, the action plan unit 43 sets the priority regarding display selection higher for the parking position candidates in front of a reference position than for the parking position candidates behind the reference position (hereinafter, referred to as a first rule). Here, the reference position is the position of the door mirror. The parking position candidates in front of the reference position may include those overlapping with the reference position in the fore and aft direction, while the parking position candidates behind the reference position do not include those overlapping with the reference position in the fore and aft direction. By setting the priority in this way, in the parking operation the control device 15 can confirm the situation of each parking position candidate, such as the position of the obstacle(s), by the external environment sensor 7 and then move the vehicle to the target parking position.

In addition, the action plan unit 43 preferably sets the priority regarding display selection higher for the parking position candidates on the left side of the vehicle than for the parking position candidates on the right side of the vehicle (hereinafter, referred to as a second rule). Here, the rule of setting a higher priority for the parking position candidates on the left side than for the parking position candidates on the right side is suitable for the countries of left-hand traffic, and the priority should be reversed in the countries of right-hand traffic. The second rule is used because in the countries of left-hand traffic, parking spaces are often provided on the left side of the passage. In addition, the driver is accustomed to parking the vehicle in the parking space on the left side of the passage, and thus, the driver does not feel uneasiness when the automatic parking process is executed to park the vehicle in the parking space on the left side of the passage.

Figure 4A:
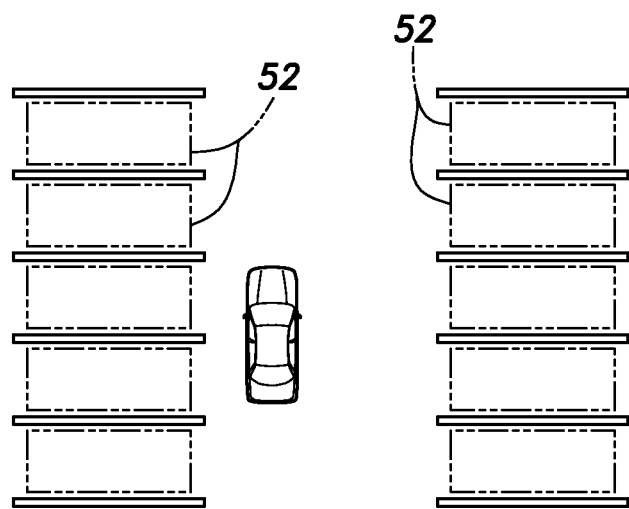
FIGS. 4A and 4B are explanatory diagrams showing display selection of parking position candidates based on the priority determined by the first and second rules.
Figure 4B:
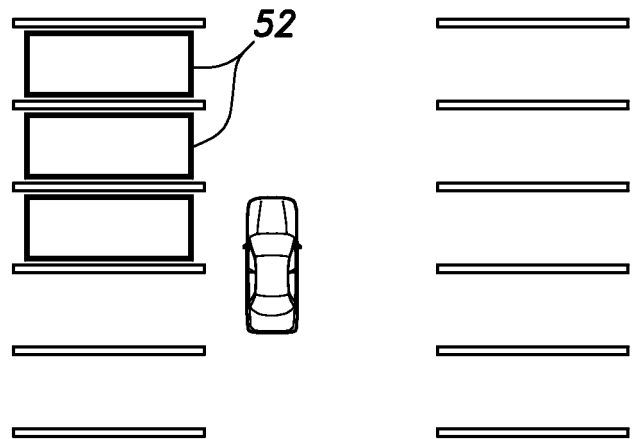

For example, with the first and second rules being set regarding the priority, if the vehicle is stopped on a passage in a property as shown in FIG. 4A and the automatic parking process is started, the action plan unit 43 selects the parking position candidates (in this example, the delimited parking spaces 52) to be displayed on the touch panel 32 according to the above rules, as shown in FIG. 4B. Note that it is possible that the parking position candidates in front of the reference position do not include those overlapping with the reference position in the fore and aft direction, and the parking position candidates behind the reference position may include those overlapping with the reference position in the fore and aft direction.

Alternatively, the action plan unit 43 may set the priority regarding display selection such that the priority becomes higher for a parking position candidate located closer to the predetermined reference position of the vehicle or the priority increases as the parking position candidate comes closer to the predetermined reference position (hereinafter, referred to as a third rule). In the present embodiment, the reference position is the position of the left door mirror as in the above. This rule may be set together with the rule that the priority for the parking position candidates in front of the reference position is higher than that for the parking position candidates behind the reference position, or may be set solely. By setting the priority such that the priority becomes higher for the parking position candidate closer to the predetermined reference position of the vehicle, it is possible to display, on the touch panel 32, the parking position candidate that is close to the predetermined reference position of the vehicle and is easy to park the vehicle in.

Figure 5A:
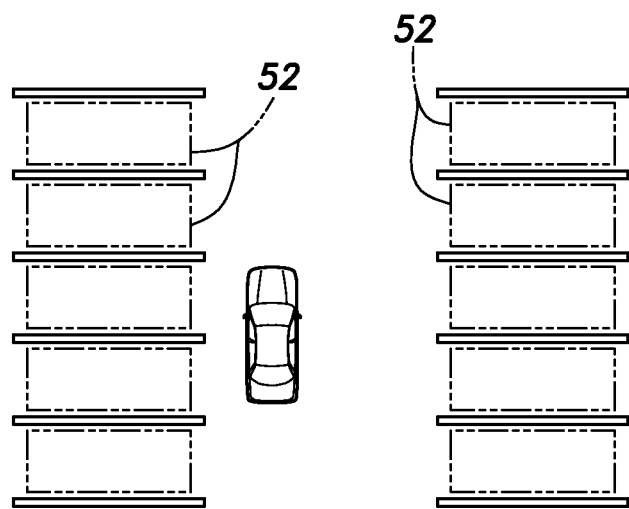
FIGS. 5A and 5B are explanatory diagrams showing display selection of the parking position candidates based on the priority determined by the third rule.
Figure 5B:
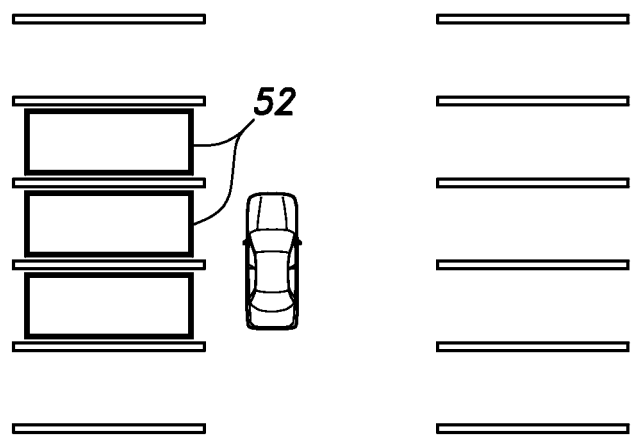

For example, with the third rule being set regarding the priority, if the vehicle is stopped on a passage in a property as shown in FIG. 5A and the automatic parking process is started, the action plan unit 43 selects the parking position candidates (in this example, the delimited parking space 52) to be displayed on the touch panel 32 according to the above rule, as shown in FIG. 5B.

The action plan unit 43 selects the upper limit number of parking position candidates to be displayed on the touch panel 32 according to the predetermined rule(s) set as described above. At this time, the action plan unit 43 may select multiple parking position candidates partially overlapping with each other (such as the single parallel parking position candidate and the two perpendicular parking position candidates described above) as the parking position candidates to be displayed on the touch panel 32.

Figure 6A:
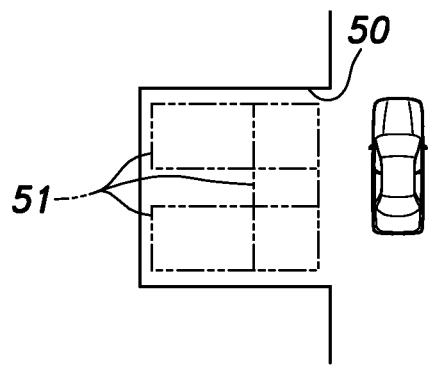
FIG. 6A is an explanatory diagram showing a parking area.
Figure 6B:
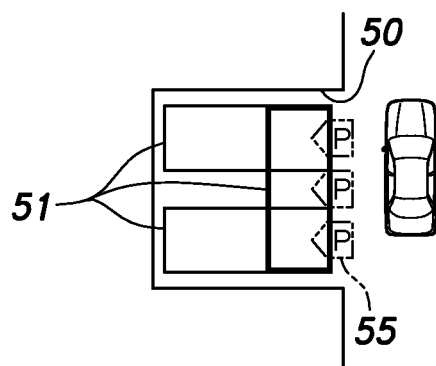
FIG. 6B is an explanatory diagram showing parking position candidates detected in the parking area.

For example, in a case where the automatic parking process is started in a place where the delimited parking space 52 cannot be detected as shown in FIG. 6A, the external environment recognizing unit 41 detects one parallel parking space and two perpendicular parking spaces (undelimited parking spaces 51) in the parking area 50 such that the parallel parking space partially overlaps with each of the perpendicular parking spaces. In this case, as shown in FIG. 6B, if the action plan unit 43 causes the parking position candidates corresponding to the detected undelimited parking spaces 51 to be displayed on the touch panel 32 so as to partially overlap with each other, the arrangement of the parking position candidates becomes complicated. Also, the relationship between icons 55 (shown by imaginary lines) to be displayed on the screen and the corresponding parking position candidate becomes difficult to recognize for the occupant. That is, it is difficult to display the parking position candidates on the touch panel 32 so as to overlap with each other and be selectable.

Figure 6C:
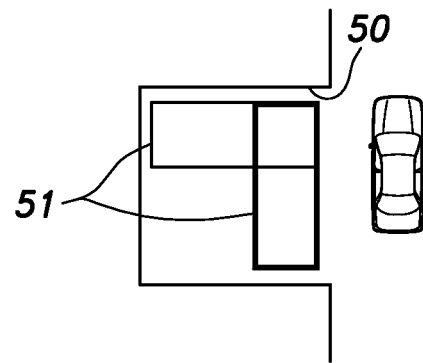
FIGS. 6C and 6D are each an explanatory diagram showing exemplary display selection of partially overlapping parking position candidates.
Figure 6D:
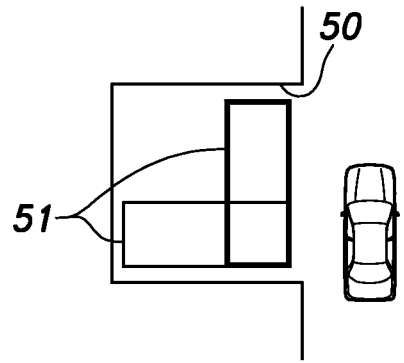

Therefore, when the multiple parking position candidates partially overlapping with each other are detected, the action plan unit 43 limits the number the detected parking position candidates that are allowed to be displayed on the touch panel 32 to two. Specifically, as shown in FIG. 6C and FIG. 6D, the action plan unit 43 causes two mutually overlapping parking position candidates selected according to the above rule(s) to be displayed on the touch panel 32 so as to partially overlap with each other and be selectable. In this case, it is preferred that the action plan unit 43 selects the parking position candidates to be displayed according to the third rule in which the priority is increased as the position of the parking position candidate approaches the left door mirror.

As described above, the external environment recognizing unit 41 is configured to detect an area around the vehicle other than passages and obstacles as the parking area 50 and to set, in the parking area 50, multiple undelimited parking spaces 51 such that the undelimited parking spaces 51 have mutually intersecting longitudinal directions and overlap with each other. As a result, multiple undelimited parking spaces 51 are set in the large parking area 50, whereby the occupant can select, as the target parking position, the parking position in which the occupant desires to park the vehicle in from among the multiple undelimited parking spaces 51 set in the parking area 50.

In a case where the automatic parking process is started by an operation of the parking main switch 34 while the vehicle is traveling, the action plan unit 43 acquires multiple parking spaces (spaces where the vehicle can be parked) successively from the external environment recognizing unit 41 and, when the number of the parking position candidates detected from these parking spaces exceeds the upper limit number, removes the parking position candidate having the lowest priority from the parking position candidates to be displayed on the touch panel 32 and erases the information thereof from the memory. In a case where the automatic parking process is started upon operation of the parking main switch 34 while the vehicle is stopped, the action plan unit 43 performs the trajectory calculation process for the parking spaces (the undelimited parking spaces 51 and the delimited parking spaces 52) detected by the external environment recognizing unit 41 in order from the one with the highest priority, and when the number of the parking spaces for which the trajectory can be calculated (namely, the number of the detected parking position candidates) reaches the upper limit number, the action plan unit 43 preferably stops performing the trajectory calculation process for the remaining parking spaces. This reduces the processing load of the action plan unit 43.

As described with reference to FIG. 3A, in the parking search screen, the action plan unit 43 displays the look-down image and the bird's-eye image side by side on the touch panel 32. That is, the action plan unit 43 is configured to be capable of performing image processing to convert the surrounding image captured by the external cameras 19 into the look-down image and the bird's-eye image. Thereby, the parking position candidates and the target parking position are displayed to be easily recognized by the occupant. Further, as described with reference to FIG. 3B, in the parking screen, the action plan unit 43 displays the look-down image and the travel direction image side by side on the touch panel 32. Thereby, the occupant can confirm the travel direction on the screen and check the progress of the autonomous movement operation in the automatic parking process in the look-down image.

Here, the look-down image is an image of the vehicle and its surroundings viewed from above. The look-down image is displayed with the front of the vehicle facing upward on the screen, and an image representing the vehicle is composited in the center of the surrounding image. The bird's-eye image is an image of the vehicle and a part of the surrounding area of the vehicle positioned in the travel direction as viewed downward in the travel direction from a view point above the vehicle and shifted in the direction opposite to the travel direction. The bird's-eye image is displayed so that the travel direction of the vehicle coincides with the upward direction of the screen, and an image representing the vehicle is composited at the bottom of the (partial) surrounding image. When the vehicle is moving forward, the bird's-eye image is an image of the vehicle and an area in front of the vehicle as viewed downward in the forward direction from a view point above and rear of the vehicle. When the vehicle is moving backward, the bird's-eye image is an image of the vehicle and an area to the rear of the vehicle as viewed downward in the rear direction from a view point above and front of vehicle. It should be noted that the determination as to whether the vehicle is moving forward or backward may be made based on the vehicle speed or the shift range. The bird's-eye image when the vehicle is stopped or in the parking range may be an image of the vehicle and the front area as viewed forward and downward as in the same manner as when the vehicle is moving forward.

Figure 7A:
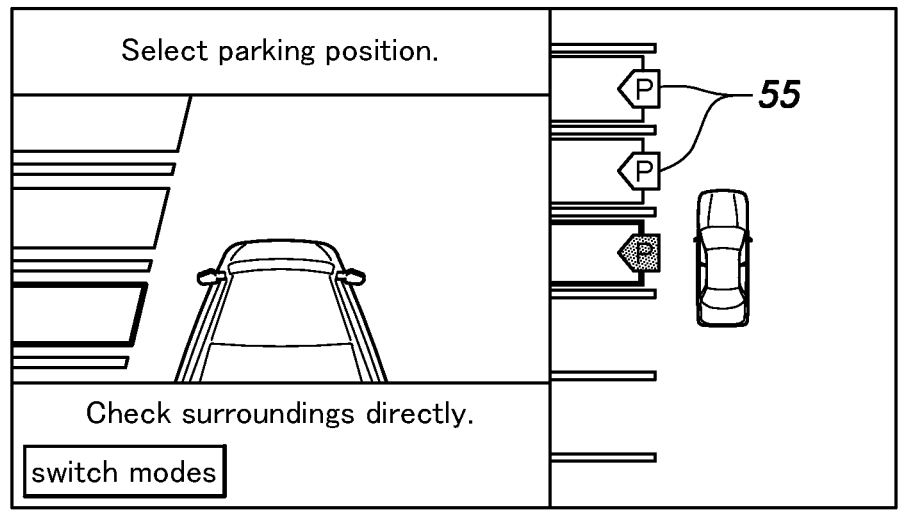
FIGS. 7A and 7B are diagrams showing the screen display of the touch panel when displaying a parking search screen before and after parking position selection, respectively.

As shown in FIG. 7A, in the parking search screen, the action plan unit 43 displays the upper limit number (3 or 2 in the present embodiment) of parking position candidates as rectangular frames and also displays the same number of icons 55 for selection so as to be associated with the corresponding parking position candidates. The parking position candidates are displayed to be superimposed on the surrounding image in the look-down image and the bird's-eye image, and the icons 55 are displayed only on the surrounding image in the look-down image in a superimposing manner. The frame of the parking position candidate selected by the cursor is shown by a thick line that is thicker than that of the frames of the other parking position candidates, and the icon 55 corresponding to the parking position candidate selected by the cursor is shown in a darker color than the icons 55 corresponding to the other parking position candidates.

In this way, in the parking search screen, the action plan unit 43 displays multiple parking position candidates on the touch panel 32 so as to be superimposed on the images captured by the external cameras 19 (the look-down image and the bird's-eye image), whereby the occupant can easily understand where in the parking area 50 the multiple parking position candidates displayed on the screen of the touch panel 32 are, and it becomes easy to select from among the multiple undelimited parking spaces 51.

Further, the action plan unit 43 displays the upper limit number of icons 55 for selection on the touch panel 32 so as to be associated with the corresponding parking position candidates, whereby, even when the entire part of some parking position candidate is not displayed on the touch panel 32, the presence of the parking position candidate can be reliably notified to the occupant by the display of the corresponding icon 55 for selection.

Figure 8A:
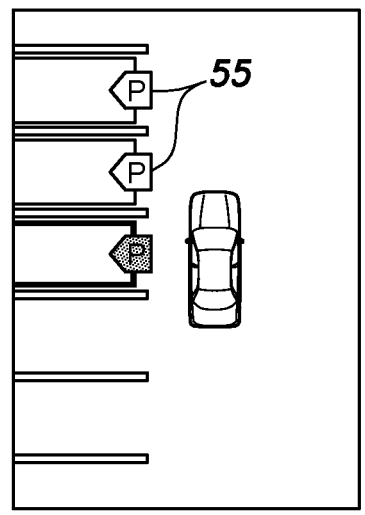
FIGS. 8A-8C are explanatory diagrams showing exemplary display of the parking position candidates and icons associated therewith for perpendicular parking, parallel parking, and angle parking, respectively.
Figure 8B:
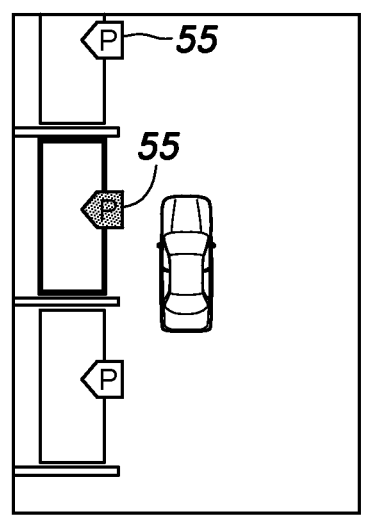
Figure 8C:
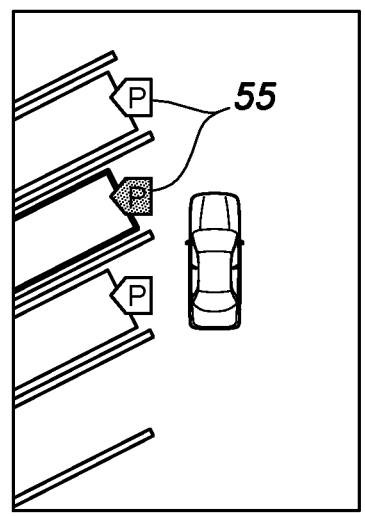

The icons 55 displayed in the look-down image in association with the parking position candidates are specifically displayed by the action plan unit 43 as follows. As shown in FIG. 8A, in the display of the parking position candidates for perpendicular parking, the action plan unit 43 displays each icon 55 at a position overlapping with the center of a short side of the frame of the corresponding parking position candidate located on the vehicle side in the vehicle width direction. As shown in FIG. 8B, in the display of the parking position candidates for parallel parking, the action plan unit 43 displays each icon 55 at a position overlapping with the center of a long side of the frame of the corresponding parking position candidate on the vehicle side. As shown in FIG. 8C, in the display of the parking position candidates for angle parking, the action plan unit 43 displays each icon 55 to coincide with an intersection between a line parallel with the fore and aft direction of the vehicle and passing through the second corner of the frame of the corresponding parking position candidate as counted from the vehicle side in the vehicle widthwise direction and a line parallel with the vehicle width direction and passing through the first corner of the frame of the corresponding parking position candidate as counted from the vehicle side.

However, if the icons 55 are displayed at the above positions, the entire part of some icon 55 may not be displayed on the screen or some icon 55 may overlap with the image representing the vehicle. Therefore, the action plan unit 43 moves the positions of some or all of the icons 55 such that the entire part of each icon 55 is displayed on the screen and none of the icons 55 overlap with the image representing the vehicle.

Figure 9A:
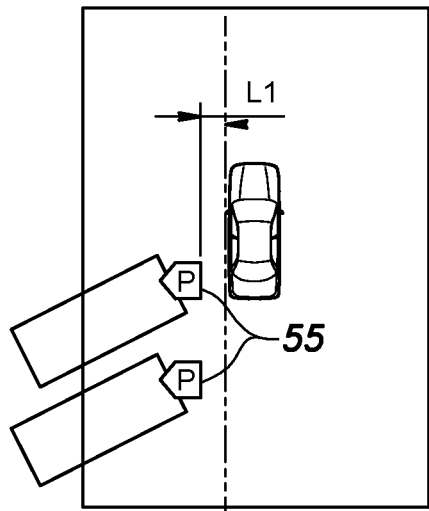
FIGS. 9A-9D are explanatory diagrams showing exemplary movement of the icons when the icons are close to the vehicle icon in the width direction, when the icons are far from the vehicle icon in the width direction, when the icons are far from the vehicle icon in the rearward direction, and when the icons are far from the vehicle in the forward direction, respectively.
Figure 9B:
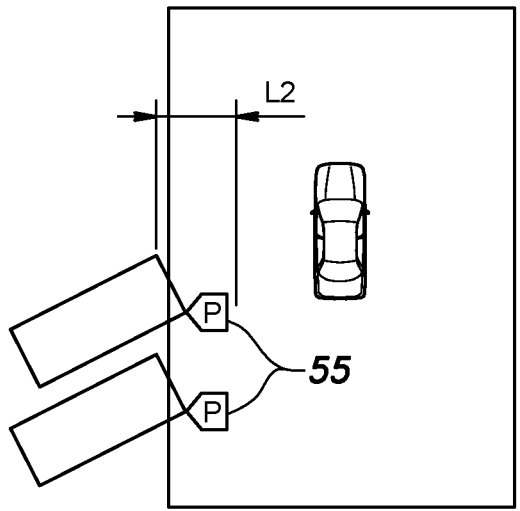
Figure 9C:
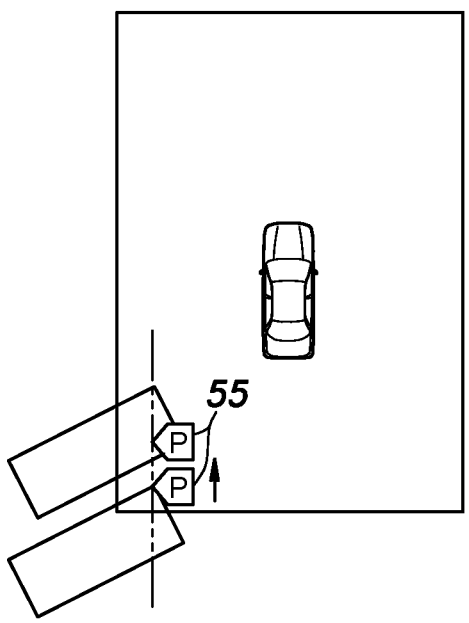
Figure 9D:
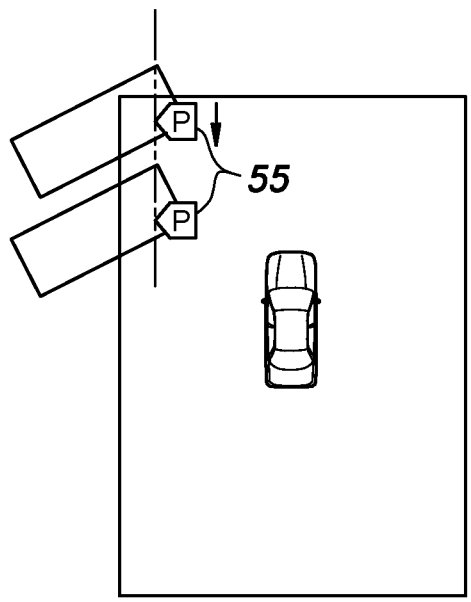

For example, when displaying the parking position candidates for angle parking, the action plan unit 43 changes the positions of the icons 55 as follows. As shown in FIG. 9A, when the frames of the parking position candidates are close to the vehicle in the width direction, the icons 55 are moved so that each icon 55 is at least a predetermined dimension L1 away from the image representing the vehicle in the width direction. As shown in FIG. 9B, when the frames of the parking position candidates are far from the vehicle in the width direction, each icon 55 is moved to approach the vehicle within a limit set by the first corner of the frame of the corresponding parking position candidate as counted from the vehicle side (with a predetermined dimension L2 being the limit). As shown in FIG. 9C, when the frames the parking position candidates are far from the vehicle in the rearward direction of the vehicle, each icon 55 is moved upward in the screen to approach the vehicle within a limit set by the upper end (front end with respect to the fore and aft direction of the vehicle) of the corresponding parking position candidate frame. As shown in FIG. 9D, when the frames of the parking position candidates are far from the vehicle in the forward direction of the vehicle, each icon 55 is moved downward in the screen to approach the vehicle within a limit set by an intersection between the corresponding frame line and a line parallel with the fore and aft direction of the vehicle and passing through the second corner of the corresponding parking position candidate as counted from the vehicle side in the vehicle width direction.

As described above, when only a part of a region of some parking position candidate is displayed on the touch panel 32, the action plan unit 43 changes the position of the corresponding icon 55 relative to the parking position candidate according to the position of the parking position candidate on the screen of the touch panel 32. Thereby, a phenomenon in which only a part of the region of some parking position candidate is displayed on the touch panel 32 and the corresponding selection icon 55 is not displayed can be prevented.

When the ratio of a part of some parking position candidate that can be displayed on the touch panel 32 to the entire part of the parking position candidate is less than or equal to a predetermined ratio (for example, 10%), the action plan unit 43 does not display the parking position candidate and the corresponding icon 55 on the touch panel 32. Thereby, it is possible to prevent the icon 55 for selection from being displayed for the parking position candidate whose part that can be displayed on the touch panel 32 is less than or equal to the predetermined ratio of the entire part of the parking position candidate.

In this case, the number of the parking position candidates displayed on the touch panel 32 becomes smaller than the upper limit number. However, even when the ratio of the part of some parking position candidate that can be displayed in the bird's-eye image is less than or equal to the predetermined ratio, if the ratio of the part of the parking position candidate that can be displayed in the look-down image is larger than the predetermined ratio, the action plan unit 43 may display the parking position candidate and the associated icon 55 in the look-down image and the bird's-eye image.

Also, as described above, when multiple parking position candidates partially overlapping with each other are detected, the action plan unit 43 causes the touch panel 32 to display the multiple parking position candidates so as to partially overlap with each other and to be selectable. Therefore, the occupant can select, as the target parking position, the parking position candidate in which the occupant desires to park the vehicle from among these parking position candidates and make the control device 15 execute the parking operation.

Figure 7B:
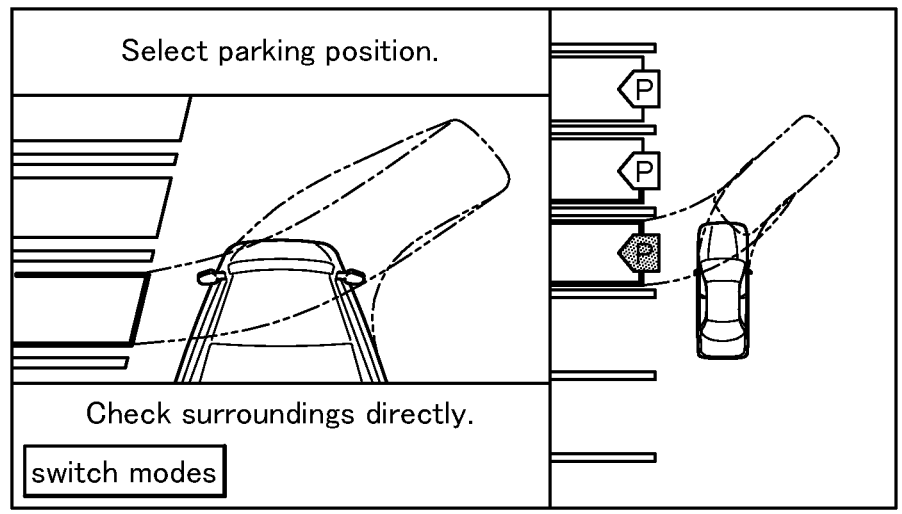

As shown in FIG. 7B, when the occupant operates the selection input member 35 to change the parking position candidate selected by the cursor in the parking search screen and performs a determination operation by operating the touch panel 32 or the selection input member 35, the action plan unit 43 sets the selected parking position candidate as the target parking position causes the icon 55 corresponding to the frame set in the target parking position to be displayed on the touch panel 32 in a color different from the color of the other icons 55. The touch panel 32 may be considered a part of the selection input member 35 in the sense that the touch panel 32 is configured to detect the occupant touching the screen with a finger or the like and receive an input operation set for the region in which the touch is detected so that the selection/determination operation can be performed with it. The display in the different color may be performed for a predetermined time, or may be continued until the drive control starts. Further, the action plan unit 43 displays the trajectory from the current position to the target parking position on the look-down image and the bird's-eye image in a superimposing manner.

Here, when displaying multiple parking position candidates partially overlapping with each other as shown in FIGS. 6C and 6D, the action plan unit 43 associates a common icon 55 with these parking position candidates and causes the touch panel 32 to display the icon(s) 55 smaller in number than the parking position candidates.

Figure 10A:
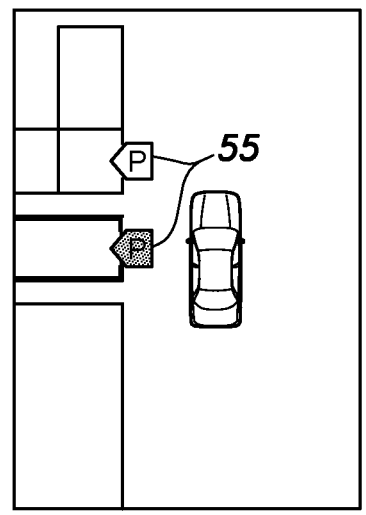
FIGS. 10A-10C are explanatory diagrams showing exemplary display of the parking position candidates and the associated icons when the parking position candidates overlap with each other.
Figure 10B:
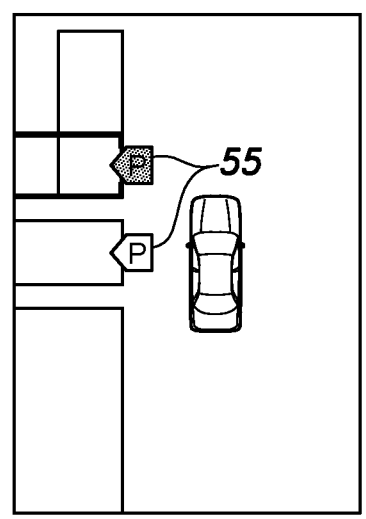
Figure 10C:
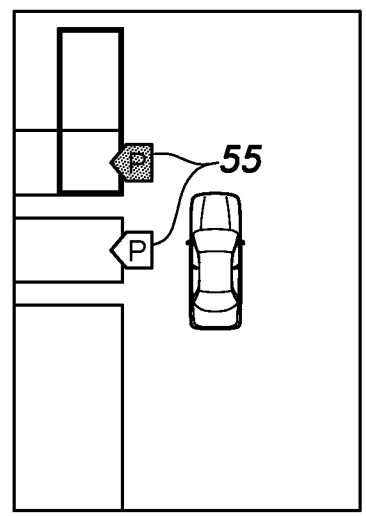

Specifically, as shown in FIG. 10A, the action plan unit 43 displays one icon 55 at mutually overlapping parts of two parking position candidates. In FIG. 10A, a single parking position candidate for perpendicular parking closest to the vehicle is selected by the cursor, the frame of this parking position candidate is shown by a thick line, and the icon 55 corresponding to the frame of this parking position candidate is shown in a darker color. When the occupant inputs a movement operation, such as rotating the select switch, to the selection input member 35, the parking position candidate selected by the cursor shifts to one of the mutually overlapping two parking position candidates (the one arranged for perpendicular parking), as shown in FIG. 10B. As a result, the frame of this parking position candidate is shown by a thick line and the corresponding common the icon 55 is shown by a dark color. If the occupant further inputs a movement operation to the selection input member 35, as shown in FIG. 10C, the parking position candidate selected by the cursor shifts to the other of the mutually overlapping two parking position candidates (the one arranged for parallel parking). As a result, the frame of this parking position candidate is shown a thick line. Since the icon 55 is common, it remains a dark color and does not change.

Moreover, when more than two parking position candidates partially overlapping with each other are detected, only two of the detected parking position candidates are displayed due to the restriction, whereby the selection operation of the target parking position is prevented from being complicated and erroneous selection operation of the target parking position can be avoided.

When the occupant selects a desired parking position from among the parking position candidates by the determination operation with the selection input member 35, the parking position candidate selected by the cursor is set as the target parking position. On the other hand, when the occupant touches the touch panel 32 to select a desired parking position from among the parking position candidates, the parking position candidate touched by the occupant is set as the target parking position. In the case where the occupant selects/determines the target parking position by touching the touch panel 32, the occupant may touch the mutually overlapping parts of the two parking position candidates or the common icon 55 therefor inadvertently or due to insufficient understanding of the operating method. If the input operation to the touch panel 32 is invalidated in such a case, the occupant may feel it troublesome to perform the determination operation to determine the target parking position or may feel uneasy or frustrated with the situation that the target parking position cannot be determined.

Figure 11A:
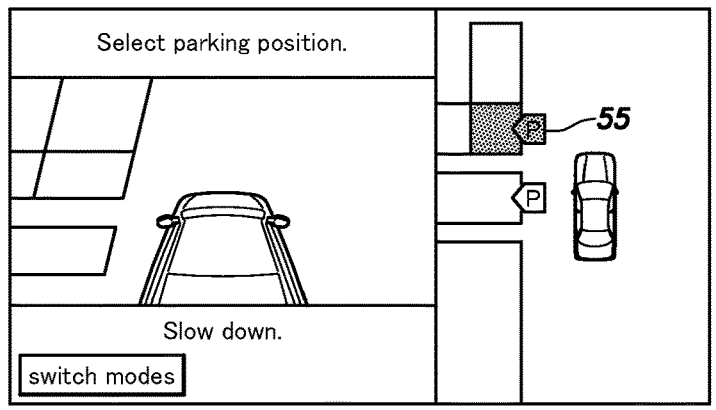
FIG. 11A is a diagram showing a parking search screen displaying two parking position candidates having partially overlapping parts.
Figure 11B:
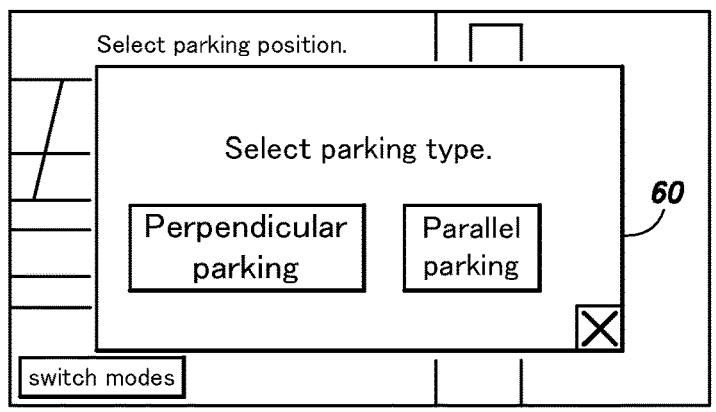
FIGS. 11B-11D are each a diagram showing the parking search screen on which a selection screen is displayed in response to detection of a touch on the overlapping parts of the two parking position candidates.
Figure 11C:
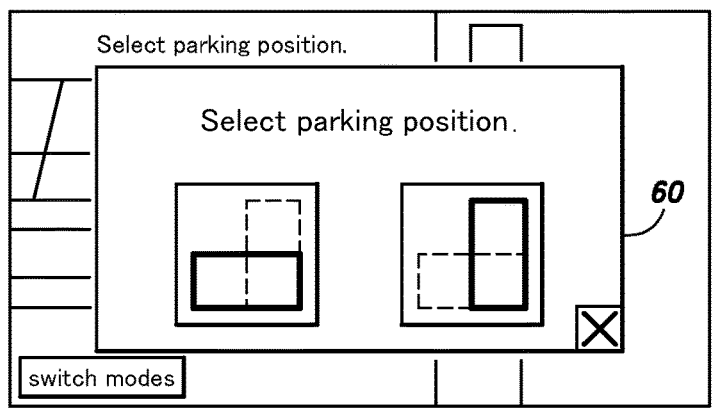
Figure 11D:
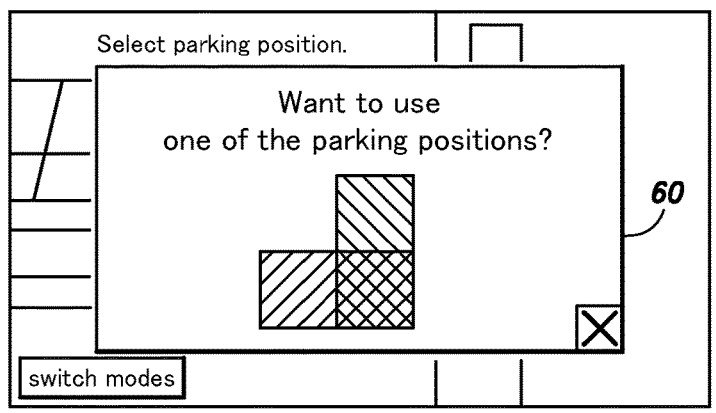

Therefore, when the touch panel 32 detects an operation of touching the mutually overlapping parts of the two parking position candidates or the common icon 55 therefor as shown by hatching in FIG. 11A, the action plan unit 43 displays a selection screen 60 on the parking search screen as shown in each of FIGS. 11B to 11D. These selection screens 60 are screens for allowing the occupant to select one of the two parking position candidates having the mutually overlapping parts touched by the occupant or one of the two parking position candidates associated with the common icon 55 touched by the occupant. In the illustrated examples, the selection screen 60 is displayed in the form of a popup screen on the parking search screen which is a main screen. In another example, the screen of the touch panel 32 may be switched from the parking search screen to the selection screen 60.

In the selection screen 60, a message "Select parking type" and two selection buttons "Perpendicular parking" and "Parallel parking" are displayed, as shown in FIG. 11B. Alternatively, as shown in FIG. 11C, it is possible to display a message "Select parking position" together with two selection buttons resembling a perpendicular parking position candidate and a parallel parking position candidate, respectively. Also, as shown in FIG. 11D, it is possible to display a message "Want to use one of the parking positions?" and an enlarged view of the two parking position candidates partially overlapping with each other in a selectable manner.

Thus, when the touch panel 32 detects a touch on the mutually overlapping parts of multiple parking position candidates, the action plan unit 43 displays the selection screen 60 on the touch panel 32, whereby the occupant can select one of the parking position candidates on the screen 60 without fail.

On the other hand, when selecting a desired parking position from the parking position candidates displayed on the touch panel 32, the occupant may touch a part of two partially overlapping parking position candidates other than the mutually overlapping parts thereof (a part other than the hatched part in FIG. 11A). In such a case, the action plan unit 43 sets the parking position candidate touched by the occupant as the target parking position without displaying the selection screen 60. This is because the touch on a part of the two parking position candidates other than the mutually overlapping parts is considered to properly reflect the desired parking position of the occupant. This allows the occupant to determine the target parking position with a smaller number of operations.

However, even when the occupant touched a part of the two partially overlapping parking position candidates other than the mutually overlapping parts thereof, it is still possible that the occupant touched an unintended position by mistake. Therefore, the action plan unit 43 may display a confirmation screen 61 as shown in each of FIGS. 12A to 12D instead of displaying the selection screen 60. These confirmation screens 61 are screens for allowing the occupant to confirm the selection of the parking position candidate on which the touch was detected. In the illustrated examples, the confirmation screen 61 is displayed in the form of a popup the screen on the parking search screen which is a main screen. In another example, the screen of the touch panel 32 may be switched from the parking search screen to the confirmation screen 61.

Figure 12A:
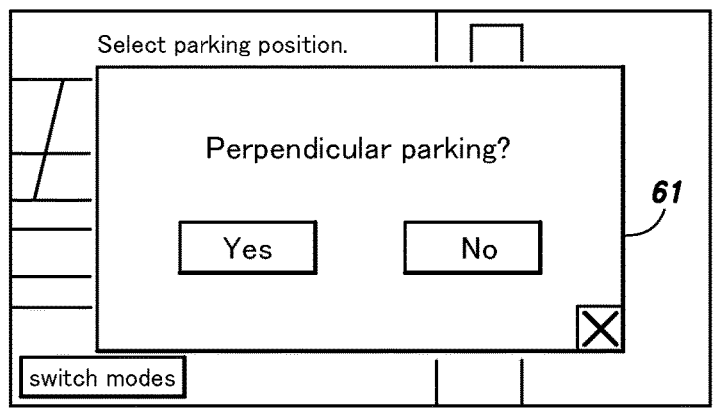
FIGS. 12A-12D are each a diagram showing the parking search screen on which a confirmation screen is displayed in response to detection of a touch on a part of the two parking position candidates other than the overlapping parts.
Figure 12B:
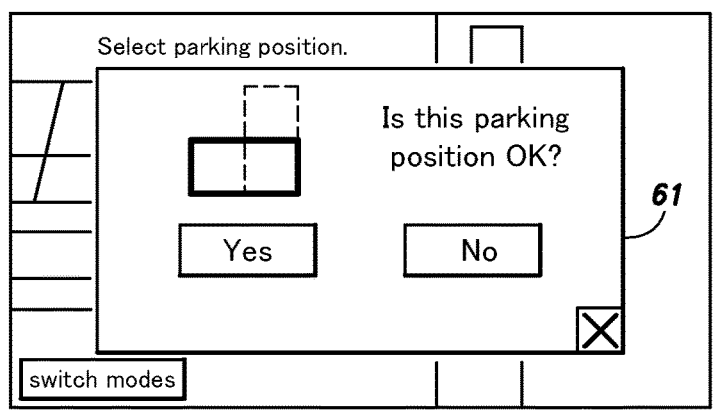
Figure 12C:
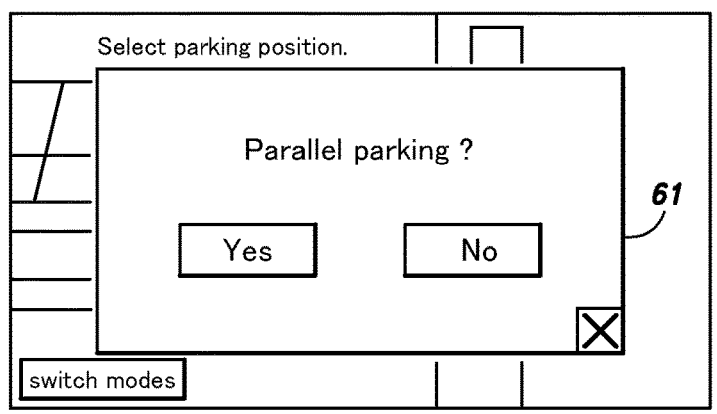
Figure 12D:
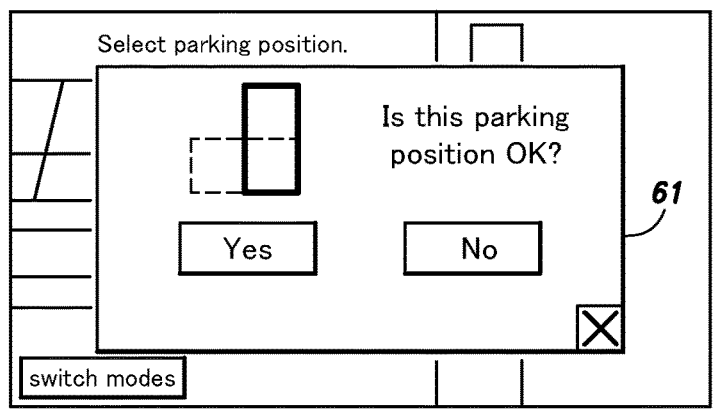

When a touch is detected on a part of a perpendicular parking position candidate that does not overlap with a parallel parking position candidate, a message "Perpendicular parking?" and two selection buttons "Yes" and "No" are displayed in the confirm screen 61, as shown in FIG. 12A. Alternatively, as shown in FIG. 12B, it is possible to display a diagram showing a perpendicular parking position candidate together with a message "Is this parking position OK?" and two selection buttons "Yes" and "No." Also, when a touch is detected on a part of the parallel parking position candidate that does not overlap with the perpendicular parking position candidate, a message "Parallel parking?" and two selection buttons "Yes" and "No" are displayed in the confirmation screen 61, as shown in FIG. 12C. Alternatively, as shown in FIG. 12D, it is possible to display a diagram showing the parallel parking position candidate together with a message "Is this parking position OK?" and two selection buttons "Yes" and "No."

Thus, when the touch panel 32 detects a touch on a non-overlapping part of multiple mutually overlapping parking position candidates, the action plan unit 43 displays the confirmation screen 61 on the touch panel 32, whereby it is possible to prevent an undesired parking position candidate from being selected inadvertently by an erroneous operation. Therefore, the occupant can set the desire parking position candidate as the target parking position without fail.

The acquisition process (step ST1 in FIG. 2) for acquiring the parking spaces and the trajectory calculation process (step ST2 in FIG. 2) can be executed when the vehicle is traveling as described above. However, when the vehicle is moving at a high speed, the detection accuracy of the parking position candidates decreases. Therefore, the action plan unit 43 disables the selection of the target parking position by the selection input member 35 when the vehicle speed is equal to or higher than a first predetermined value (for example, 5 km/h). This prevents the occupant's selection operation to select one of the parking position candidates detected with low detection accuracy. This also prevents the selection operation from distracting the driver's attention from the driving operation while the vehicle is traveling.

Figure 13A:
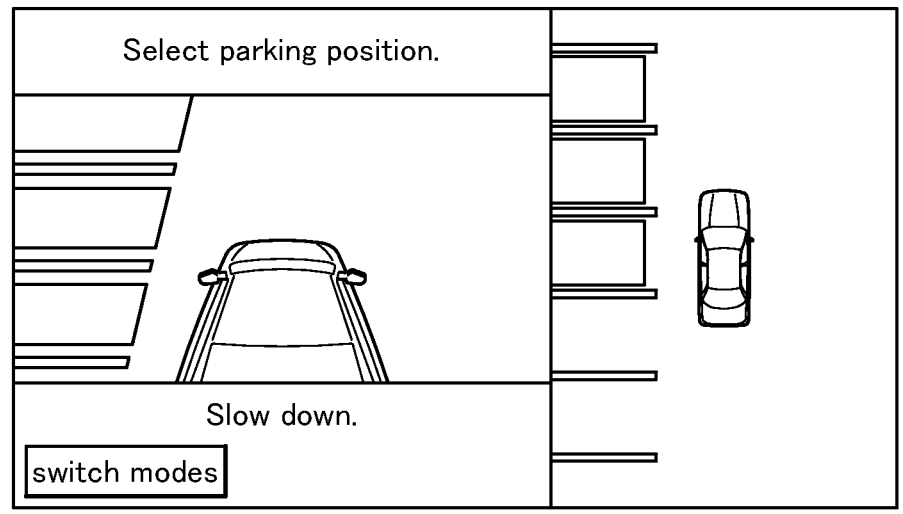
FIGS. 13A and 13B are diagrams showing the parking search screen of the touch panel when the vehicle speed is a first predetermined value or higher and when the vehicle speed is a second predetermined value or higher, respectively.

Also, when the vehicle speed is equal to or higher than the first predetermined value, the action plan unit 43 causes the touch panel 32 to display the parking position candidates to be unselectable by the selection input member 35. Specifically, as shown in FIG. 13A, the action plan unit 43 displays frames indicating the detected parking position candidates on the touch panel 32, but does not display the icons 55 for selection on the touch panel 32. From this, the occupant can understand that the parking position candidate cannot be selected when the vehicle is traveling at the first predetermined value or higher. Therefore, the occupant is prompted to decrease the vehicle speed so that the parking position candidate can be detected at a low vehicle speed where the detection accuracy is high. At this time, the action plan unit 43 may preferably display a notification on the touch panel 32 such as "Select parking position." and "Slow down."

Figure 13B:
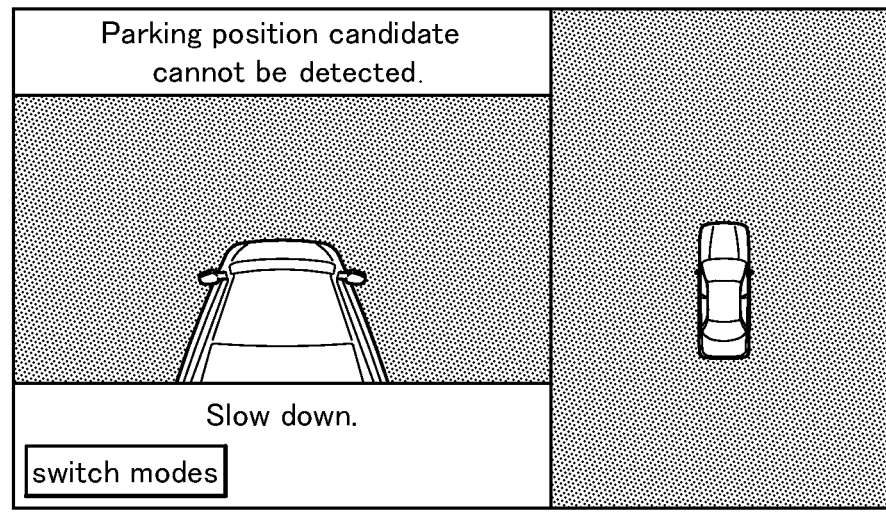

When the vehicle speed is equal to or higher than a second predetermined value (for example, 10 km/h) that is higher than the first predetermined value (when the vehicle speed is equal to or higher than the prescribed vehicle speed at which parking position candidates can be searched for), the action plan unit 43 does not display the parking position candidates on the touch panel 32. More specifically, as shown in FIG. 13B, the action plan unit 43 masks a portion of each of the bird's-eye image and the look-down image other than the image representing the vehicle (namely, a portion corresponding to the surrounding image) in the parking search screen. From this, the occupant can understand that the parking position candidates cannot be detected when the vehicle is travel at the second predetermined value or higher. Therefore, the occupant is prompted to decrease the vehicle speed so that the parking position candidates can be detected. At this time, the action plan unit 43 may preferably display a notification on the touch panel 32 such as "Parking position candidate cannot be detected." and "Slow down."

Concrete embodiments of the present invention have been described in the foregoing, but the present invention should not be limited by the foregoing embodiments and various modifications and alterations are possible within the scope of the present invention. For example, the concrete structure, arrangement, number, process content and procedure, etc. of the components/units of the embodiments may be appropriately changed within the scope of the present invention. Also, not all of the structural elements shown in the above embodiments are necessarily indispensable and they may be selectively adopted as appropriate.

The invention claimed is:

1. A parking assist system, comprising:
a parking position candidate detector configured to detect one or more parking position candidates, each consisting of an undelimited parking space set in a parking area around a vehicle or an available delimited parking space around the vehicle;
a display device configured to display the one or more parking position candidates on a screen;
a selection input member configured to receive a selection operation by an occupant of the vehicle to select one of the one or more parking position candidates displayed on the display device; and
a control device configured to control screen display of the display device, to set the parking position candidate selected by the occupant via the selection input member as a target parking position, and to control an autonomous parking operation to autonomously move the vehicle to the target parking position,
wherein when multiple parking position candidates partially overlapping with each other are detected by the parking position candidate detector, the control device causes the display device to display the multiple parking position candidates so as to partially overlap with each other and to be selectable, and
wherein the parking position candidate detector is configured to detect the parking area as an area around the vehicle other than passages and obstacles and to set multiple undelimited parking spaces, each including a longitudinal direction defined along a major axis of the respective undelimited parking space, in the parking area such that the longitudinal directions of the multiple undelimited parking spaces intersect with each other and the multiple undelimited parking spaces partially overlap with each other.

2. The parking assist system according to claim 1, wherein the multiple parking position candidates partially overlapping with each other include at least two of a parallel parking position candidate, a perpendicular parking position candidate, and an angle parking position candidate.

3. The parking assist system according to claim 2, wherein the selection input member includes a touch panel configured to detect a touch on the screen of the display device and to receive an input operation set for a region in which the touch is detected, and
wherein when the touch panel detects a touch on mutually overlapping parts of the multiple parking position candidates in the screen, the control device causes the display device to display a selection screen for selecting one of the multiple parking position candidates including the mutually overlapping parts.

4. The parking assist system according to claim 3, wherein when the touch panel detects a touch on a non-overlapping part of one of the multiple parking position candidates partially overlapping with each other, the control device causes the display device to display a confirmation screen for confirming selection of the parking position candidate having the non-overlapping part on which the touch was detected.

5. The parking assist system according to claim 1, wherein when the multiple parking position candidates partially overlapping with each other are detected by the parking position candidate detector, the control device limits a number of those among the multiple parking position candidates partially overlapping with each other that are allowed to be displayed on the display device to two.

6. The parking assist system according to claim 1, further comprising an imaging device configured to capture an image of surroundings of the vehicle,
wherein the control device is configured to cause the display device to display the one or more parking position candidates so as to be superimposed on the image captured by the imaging device.

7. The parking assist system according to claim 6, wherein when a vehicle speed is equal to or higher than a first predetermined value, the control device disables selection of the target parking position by the selection input member.

8. The parking assist system according to claim 7, wherein when the vehicle speed is equal to or higher than the first predetermined value, the control device causes the display device to display the one or more parking position candidates so as to be unselectable by the selection input member.

9. The parking assist system according to claim 7, wherein when the vehicle speed is equal to or higher than a second predetermined value higher than the first predetermined value, the control device does not cause the display device to display the one or more parking position candidates.

* * * * *